United States Patent
Zhang et al.

(10) Patent No.: US 9,846,665 B2
(45) Date of Patent: Dec. 19, 2017

(54) CHIP SYNCHRONIZATION BY A MASTER-SLAVE CIRCUIT

(71) Applicant: STMicroelectronics Asia Pacific Pte Ltd, Singapore (SG)

(72) Inventors: Chaochao Zhang, Singapore (SG); Chee Weng Cheong, Singapore (SG); Dianbo Guo, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 201 days.

(21) Appl. No.: 14/534,091

(22) Filed: Nov. 5, 2014

(65) Prior Publication Data

US 2016/0124881 A1    May 5, 2016

(51) Int. Cl.
*G06F 13/364* (2006.01)
*G06F 5/06* (2006.01)
*G06F 13/42* (2006.01)

(52) U.S. Cl.
CPC ........... *G06F 13/364* (2013.01); *G06F 5/065* (2013.01); *G06F 13/4282* (2013.01); *G06F 2205/067* (2013.01)

(58) Field of Classification Search
CPC .............. G06F 13/364; G06F 13/4282; G06F 2205/067; G06F 5/065
See application file for complete search history.

(56) References Cited

U.S. PATENT DOCUMENTS

| | | | | |
|---|---|---|---|---|
| 2002/0108011 A1* | 8/2002 | Tanha | ............... | G06F 13/4291 710/306 |
| 2003/0090255 A1* | 5/2003 | Bassett | ............... | H02J 1/102 323/284 |
| 2004/0088441 A1* | 5/2004 | Chiang | ............... | G06F 13/4022 710/1 |
| 2008/0158177 A1* | 7/2008 | Wilson | ............... | G06F 3/0416 345/173 |
| 2011/0070010 A1* | 3/2011 | Richards | ............ | B41F 13/0045 400/76 |
| 2014/0089543 A1* | 3/2014 | Creager | ............. | G06F 13/4081 710/110 |
| 2015/0254198 A1* | 9/2015 | Anderson | ............ | G06F 13/364 710/110 |
| 2016/0124881 A1* | 5/2016 | Zhang | ............... | G06F 5/065 710/110 |

* cited by examiner

*Primary Examiner* — Terrell Johnson
(74) *Attorney, Agent, or Firm* — Seed Intellectual Property Law Group LLP

(57) ABSTRACT

A master-slave circuit is disclosed that maintains synchronization between two integrated circuit chips, using minimal chip resources. In one embodiment, a single, bidirectional communication path is shared by the two chips. Meanwhile, only one I/O port on each chip is used to send and receive signals via the bidirectional communication path. The first chip to detect a signal event is designated the master and controls the bidirectional communication path. The master can communicate the status to the other chip by controlling the logic state of the I/O ports. When the second chip detects that the I/O port is controlled by the first chip, the second chip will logically deduce that it is now the slave. If both chips detect the signal event at substantially the same time, one of the two chips is pre-programmed to assume control of the I/O port as the master.

20 Claims, 5 Drawing Sheets

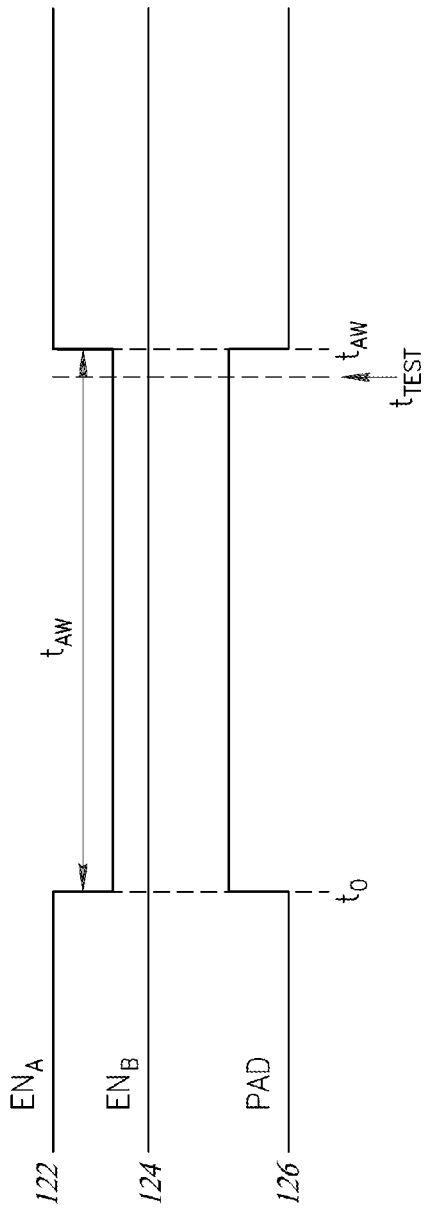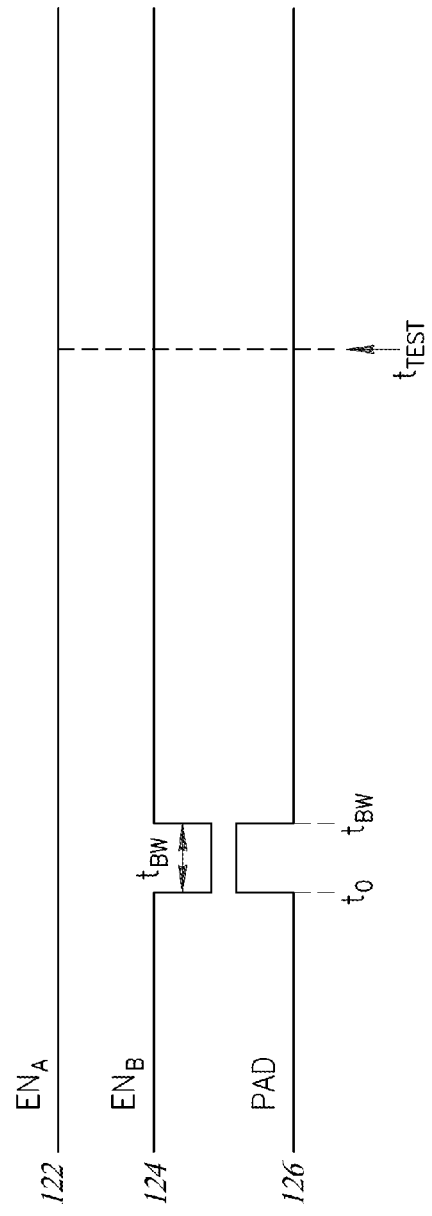

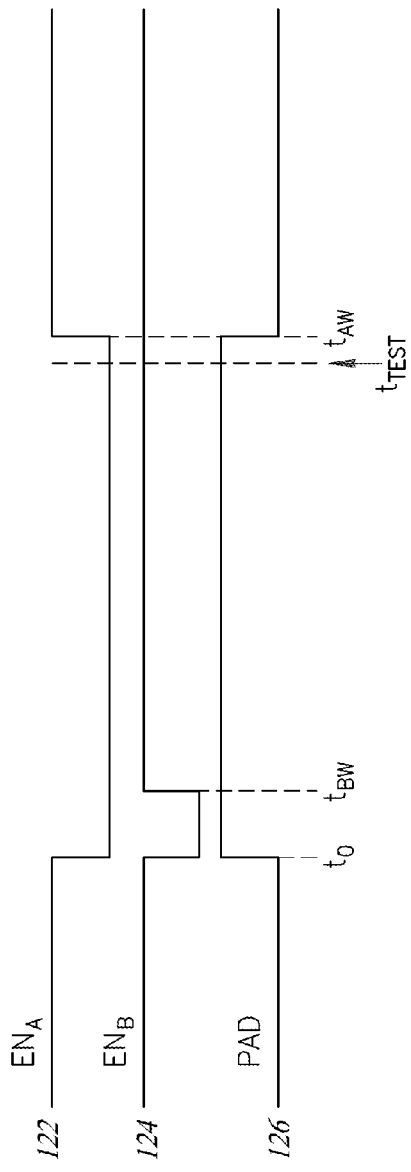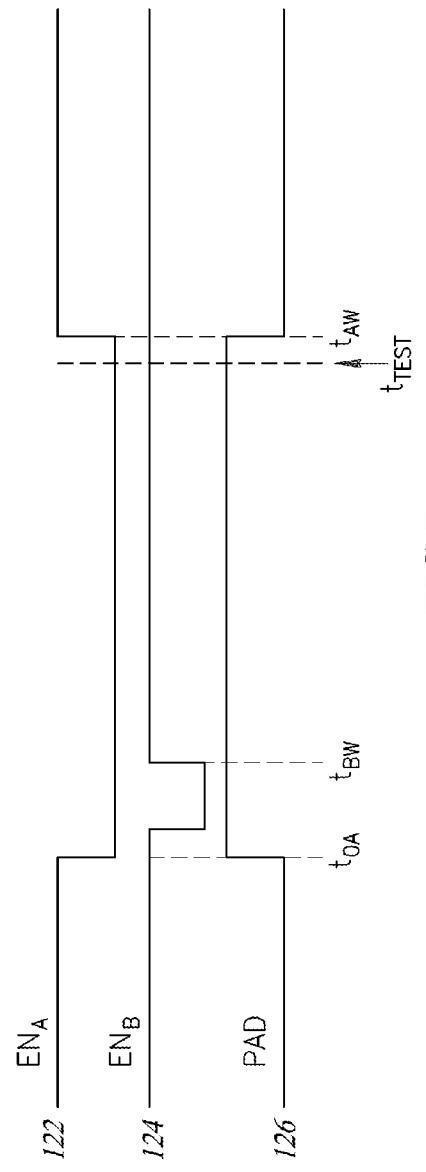

CHIP SYNCHRONIZATION BY A MASTER-SLAVE CIRCUIT

BACKGROUND

Technical Field

The present disclosure generally relates to communication among integrated circuit chips and, in particular, to determining which one of a pair of chips will assume control of a shared communication link following detection of a signal event.

Description of the Related Art

In some electronic circuits, it is beneficial to coordinate electrical signals transmitted among components such as integrated circuit chips. For example, it may be desirable for a microelectronic controller that communicates signals to external chips to present the same pattern of control logic or control waveforms to multiple chips to ensure that signal events are communicated to all of the chips, not just one chip. More specifically, in the case of devices such as smart phones that include touch panels, more than one controller may be used to drive an entire touch screen. In one example, a first controller may control the bottom of the screen while a second controller controls the top of the screen. Thus, it may be beneficial for the same waveform pattern to be delivered to both halves of the touch screen panel. In another example, when one controller detects a signal event such as signal noise, the signal event is communicated to the other controller so that the two chips remain synchronized. In such a situation, the chip that detects the signal event first is typically designated as the master and the other chip is designated as the slave.

A straightforward way to maintain such synchronization is to configure the two chips with a pair of input/output (I/O) pads on each chip, and two separate communication paths, as shown in FIG. 1. In this way, whichever chip detects the signal event first can notify the other chip of the status via a dedicated communication path. However, maintaining two separate dedicated, unidirectional communication paths and four associated I/O ports consumes valuable chip real estate and operational resources.

BRIEF SUMMARY

A master-slave circuit is disclosed that maintains synchronization between two integrated circuit chips, using minimal chip resources. In one embodiment, a single, bidirectional communication path is shared by the two chips. Meanwhile, only one I/O port on each chip is used to send and receive signals via the bidirectional communication path. The first chip to detect a signal event is designated the master and controls the bidirectional communication path, while the second chip is designated as the slave. The master can communicate the status to the second chip by controlling the logic state of the I/O ports. When the second chip detects that it is not in control of the I/O port, the second chip will logically deduce that it is now the slave. If both chips detect the signal event at substantially the same time, one of the two chips is designed to assume control of the I/O port as the master.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

FIGS. 4-7 are timing sequence graphs of digital signals associated with the master-slave circuit of FIG. 2, according to one embodiment described herein.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of managing communications among integrated circuit chips, comprising embodiments of the subject matter disclosed herein, have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Reference throughout the specification to integrated circuits is generally intended to include integrated circuit components built on semiconducting substrates, whether or not the components are coupled together into a circuit or able to be interconnected.

Reference throughout the specification to a binary logic state '1' is used interchangeably with the term 'high', as is customary in the art. Likewise, reference throughout the specification to a binary logic state '0' is used interchangeably with the term 'low'.

Specific embodiments are described herein with reference to integrated circuit chips that have been produced; however, the present disclosure and the reference to certain device details, circuit schematics, and ordering of method steps are exemplary and should not be limited to those shown.

Figure 1:
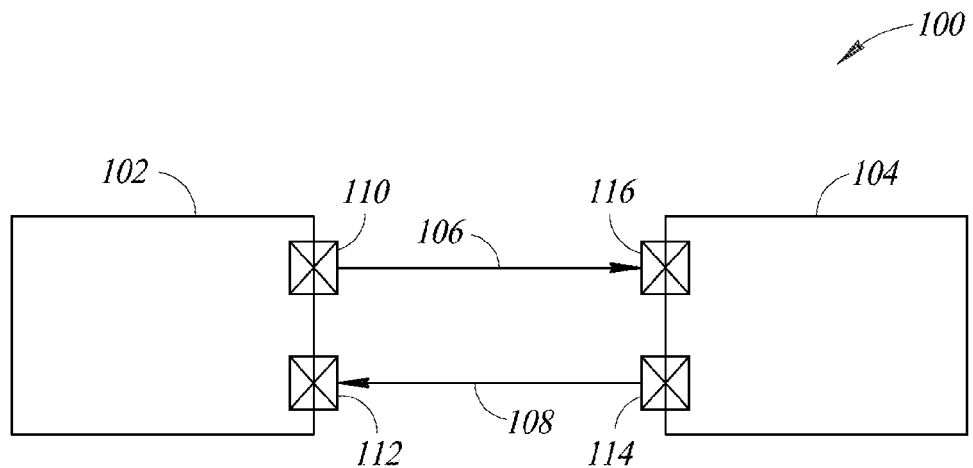
FIG. 1 is a block diagram showing components of a conventional master-slave circuit, according to the prior art.

FIG. 1 shows a conventional chip intercommunication scenario 100 in which a pair of integrated circuit chips 102 and 104 communicate with one another via separate unidirectional signal paths 106 and 108. The unidirectional signal paths 106 and 108 are coupled to the integrated circuit chips 102 and 104 via input/output (I/O) ports 110, 112, 114, and 116, respectively. The unidirectional signal path 106 is used to transmit information from chip 102 to chip 104, while the unidirectional signal path 108 is used to transmit information from chip 104 to chip 102. The chip intercommunication scenario 100 is straightforward because each chip has a dedicated set of transmission components to use at any time. Chip 102 has full use of and control over I/O ports 110, 116, and the unidirectional signal path 106. Chip 104 has full use of and control over I/O ports 112 and 114, and the unidirectional signal path 108. Therefore, coordination between the chips 102 and 104 regarding their inter-communication per se is generally not necessary, which allows the chips 102 and 104 to remain autonomous, and also speeds up communication. Autonomy is advantageous in the sense that communications can be initiated immediately and, if desired, simultaneously, using the scenario 100 without waiting for access to the transmission components. Less overhead time spent managing their intercommunication facilitates the integrated circuit chips 102, 104 sharing more content about other topics, and allows the chips to focus on performing their primary functions. However, the luxury of having two dedicated I/O ports available on each chip consumes a large amount of chip real estate and therefore costs more money.

Figure 2:
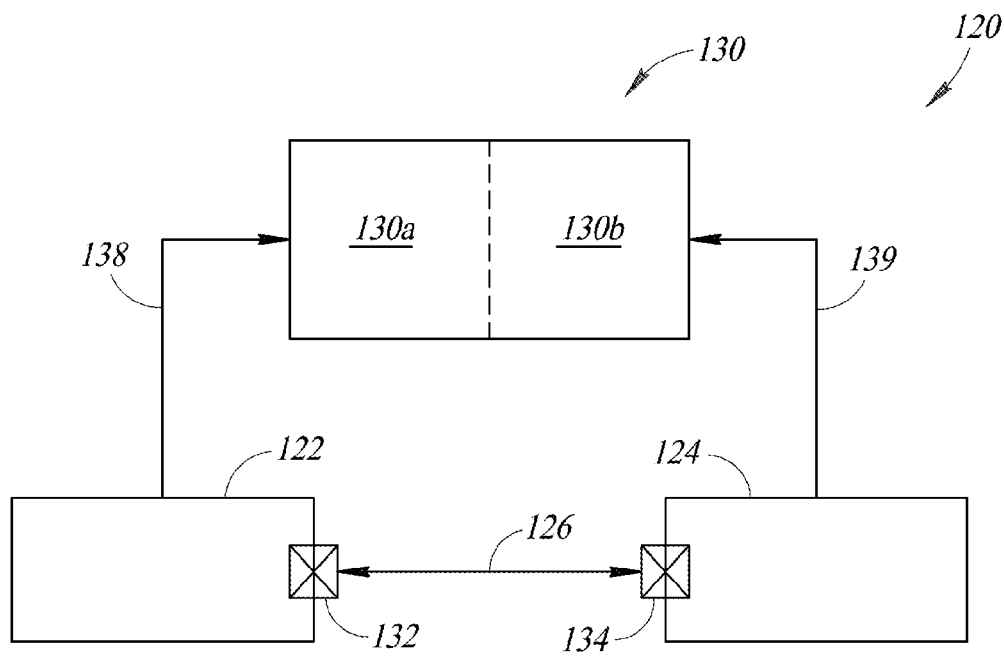
FIG. 2 is a block diagram showing components of a master-slave circuit, according to one embodiment described herein.

FIG. 2 shows a chip intercommunication scenario 120 in which a pair of integrated circuit chips 122 and 124 communicate with one another via a common, bidirectional signal path 126, according to one embodiment. The bidirectional signal path 126 is used to transmit information between chip 122 and chip 124, via bidirectional I/O ports 132 and 134, respectively. The integrated circuit chips 122 and 124 may be microcontrollers, for example, configured to control two halves of a same device such as a smart phone display 130, as illustrated in FIG. 2. The chip 122 is coupled to a first half 130a of the display 130 by a first control signal path 138, while the chip 124 is coupled to a second half 130b of the display 130 via a second control signal path 139. Because only one I/O port per chip is needed for chip-to-chip communication in the scenario 120, chip real estate is conserved, thus saving costs. However, carefully managed control of the shared bidirectional signal path 126 is desirable to prevent conflicts that may otherwise occur if both chips 122 and 124 attempt to use the bidirectional signal path 126 at the same time.

The chip intercommunication scenario 120 may be used to facilitate inter-chip communication in various electronic devices including wired or wireless communication devices such as cellular phones, smart phones, and the like, as well as computing devices including mobile computers, desktop computers, servers, and various printed circuit board elements of electronic systems.

Figure 3:
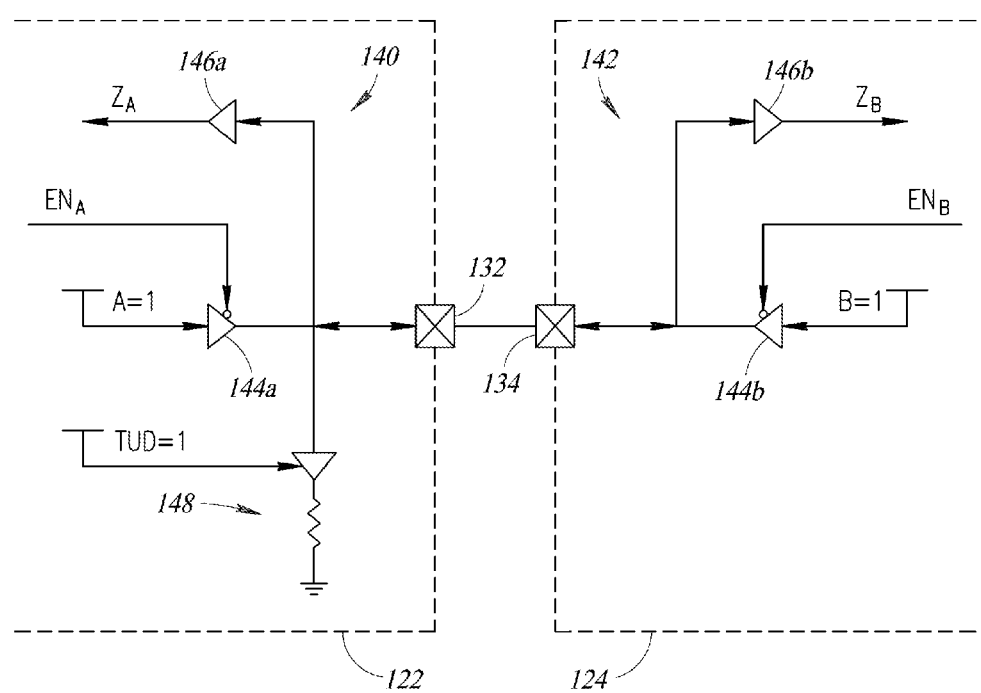
FIG. 3 is a schematic circuit diagram showing the master-slave circuit of FIG. 2 in greater detail, according to one embodiment described herein.

FIG. 3 shows the integrated circuit chips 122 and 124 in greater detail. The chips 122 and 124 are shown equipped with communication control circuitry that can be configured to manage control of the shared bidirectional signal path 126 and the I/O ports 132 and 134.

The integrated circuit chip 122 includes a communication control stage 140 that manages signal transmission and reception via the I/O port 132. The communication control stage 140 includes an active low tri-state buffer 144a, a buffer 146a, and an active high tri-state buffer 148. Data A is latched to the I/O port 132 by the active low tri-state buffer 144a in response to an enable signal $EN_A$ transitioning from a high state '1' to a low state '0'. Data $Z_A$ is received via the I/O port 132 via the buffer 146a. The signal TUD ensures that the I/O port 132 is grounded, or normally maintained at a logic state '0', so that the voltage at the I/O port 132 is not floating.

The integrated circuit chip 124 includes a communication control stage 142 that manages signal transmission and reception via the I/O port 134. The communication control stage 142 includes an active low tri-state buffer inverter 144b, and a buffer 146b. Data B is latched to the I/O port 132 by the active low tri-state buffer inverter 144b in response to an enable signal $EN_B$ transitioning from a high state '1' to a low state '0'. Data $Z_B$ is received via the I/O port 134 and the buffer 146b.

Figure 8:
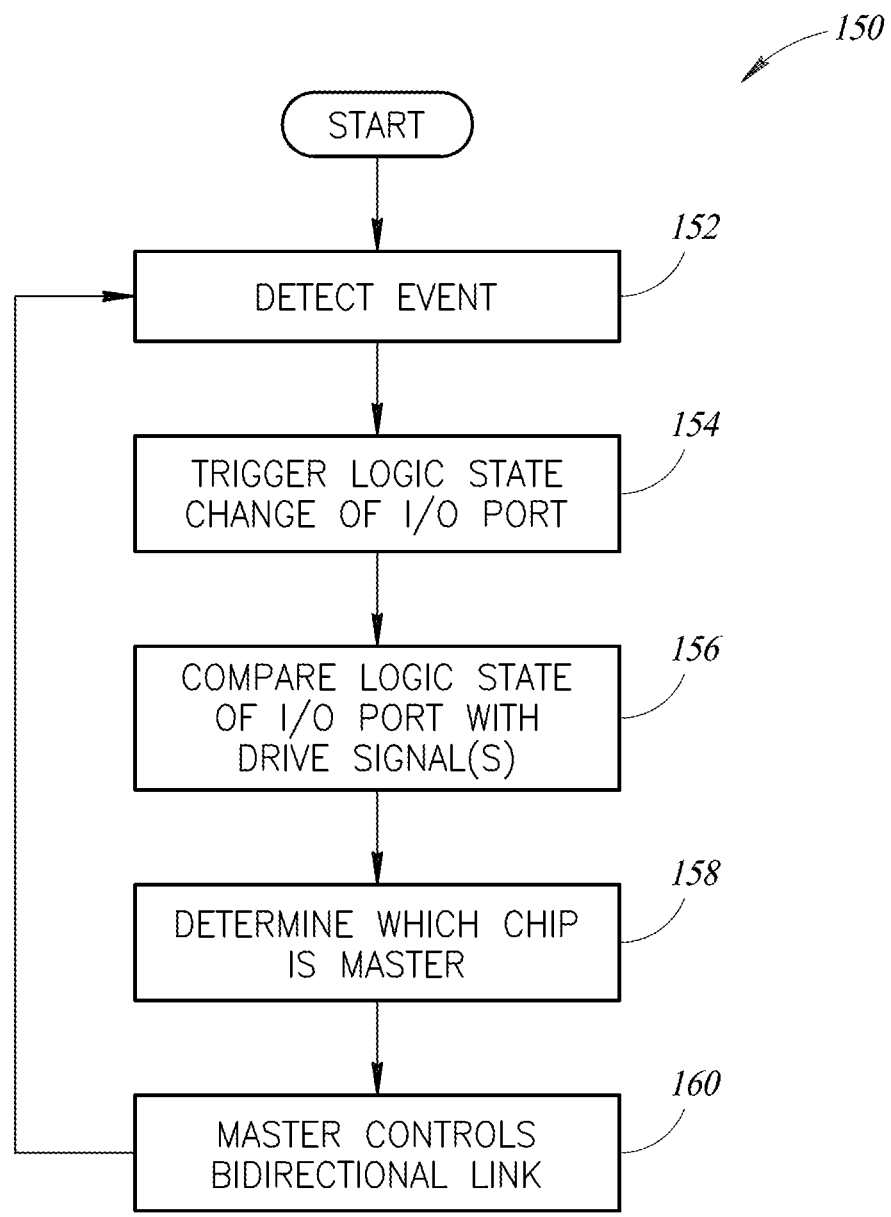
FIG. 8 is a flow diagram showing a sequence of steps in an exemplary method of operating the master-slave circuit shown in FIGS. 2-3.

FIGS. 4, 5, 6, and 7 show different examples of signal timing diagrams during operation of the communication control stages 140 and 142 according to a method 150 shown in FIG. 8. The operation of the communication control stages 140 and 142 desirably is carried out in an automated fashion according to programmed instructions that reside in a computer memory and are executed by one or more microprocessors. The microprocessor(s) can reside on the integrated circuit chip(s) 122 or 124, or on a separate integrated circuit chip. Time-varying signals shown in each of the signal timing diagrams are $EN_A$, $EN_B$, and PAD. The PAD signal represents the common logic state of both I/O ports 132, 134 which are coupled by the shared bidirectional signal path 126. Initially, PAD is low, and both of the drive signals $EN_A$ and $EN_B$ are high.

At 152, a signal event such as, for example, noise on a signal line, is detected by either chip 122, chip 124, or both.

At 154, whichever chip detects the signal event attempts to control the bidirectional signal path 126 by triggering a logic state change of the PAD signal. It is noted that whenever $EN_A$ makes a state transition, the duration of the active time interval, or width $t_{AW}$, is approximately 100 clock cycles, by design. Likewise, whenever $EN_B$ makes a state transition, the width of the active time interval, $t_{BW}$, is designed to last only a few clock cycles, for example, less than 10 clock cycles, before expiring. Thus, when the PAD signal is controlled by $EN_A$, its logic state is sustained for a long period of time, whereas when PAD is controlled by $EN_B$, its logic state is only sustained for a short period of time.

At 156, following a long time interval $t_{test}$, which time is after $t_{BW}$ but prior to $t_{AW}$, the chips 122 and 124 perform a test comparing the PAD logic state with each of the drive signals $EN_A$ and $EN_B$ to see which chip sensed the signal event and is in control as the master.

At 158, whichever drive signal has a logic state opposite that of the PAD is deemed the master. If both drive signals have logic states opposite that of PAD, chip 122 is designated as the master.

At 160, the master controls the bidirectional signal path 126 until another signal event is detected.

The timing scheme outlined above will now be described in greater detail by way of example, with reference to FIGS. 4-7 and the flow diagrams shown in FIG. 8. FIG. 4 illustrates signal timing when only chip 122 detects a signal event. In this case, chip 122 will be the master. The chip 122 senses a signal event at time $t_0$. In response, $EN_A$ transitions from high to low, which triggers latching of data A to the I/O port 132. Data A is at a logic state '1'. Thus, PAD transitions from low to high at time $t_0$. Since $EN_A$ now controls the PAD, the PAD signal remains high until $EN_A$ transitions back to a logic state '1' at time $t_{AW}$. The $EN_A$ transition then triggers a state change of the PAD, from '1' back to '0' at time $t_{AW}$. Thus, the PAD signal is a mirror image of $EN_A$. Meanwhile, chip 124 does not detect the signal event, so it remains high. At $t_{test}$, the PAD logic is checked by both chips 122 and 124. The check can be programmed to occur just prior to 100 digital clock cycles after the PAD is turned on, or just prior to $t_{AW}$. At $t_{test}$, the PAD is found to be at a logic state opposite that of $EN_A$, while $EN_B$ has remained unchanged. Accordingly, the chip 124 knows it is not driving the PAD because PAD=1 even though the chip 124 has not detected any signal event. Thus, chip 124 could not have triggered the transition of PAD from low to high. Accordingly, chip 124 deduces that the PAD is being controlled by chip 122. Thus, chip 124 understands that chip 122 is the master and that chip 124 is the slave.

FIG. 5 illustrates signal timing when only chip 124 detects a signal event. In this case, chip 124 becomes the master. When the signal event is sensed by the chip 124 at time $t_0$, $EN_B$ transitions from high to low, which triggers latching of data B to the PAD. Data B is at a logic state '1'. Thus, PAD transitions from low to high at time $t_0$ in response to $EN_B$. Since $EN_B$ now controls the PAD, the PAD signal remains high until $EN_B$ transitions back to a logic '1' state at time $t_{BW}$. In response, the PAD changes state from high back to low. However, unlike the case shown in FIG. 4, the transition of $EN_B$ back to the logic '1' state occurs at $t_{BW}$, which is after only a few clock cycles. Thus, the PAD signal is a mirror image of $EN_B$. Meanwhile, $EN_A$ remains high. At $t_{test}$, the PAD logic is checked and found to be the same as the initial state. Accordingly, the chip 124 sees that chip 122 is not sustaining the PAD at logic '1', yet chip 124 detected a signal event. Therefore chip 124 deduces that it is the master, and chip 122 is the slave. Meanwhile, chip 122 never detected the signal event, so, at time $t_{test}$, it is not driving the PAD high. Therefore, chip 122 deduces it is the slave.

FIG. 6 illustrates signal timing when both of the chips 122 and 124 detect a signal event at substantially the same time. In this case, both chips will attempt to drive the PAD. However, due to the disparity in the widths of the control signals, chip 122, which has the longer signal duration, will be the master, and chip 124 will be the slave. When the signal event is sensed by the chip 122, $EN_A$ transitions from logic '1' to logic '0', which latches A=1 to the PAD. When the signal event is sensed by chip 124, $EN_B$ also transitions from logic '1' to logic '0', which latches B=1 to the PAD. Initially, it appears that both chips are controlling the PAD. However, after several clock cycles, at time $t_{BW}$, $EN_B$ expires and reverts to logic '1', while $EN_A$ remains low. The PAD signal remains high until $EN_A$ reverts to a logic '1' state at time $t_{AW}$. Thus, chip 124 has surrendered control of the PAD to chip 122, and the PAD signal is a mirror image of $EN_A$. At $t_{test}$, the PAD logic is checked by both chips and found to still be high. At this point, the chip 124 then knows that it is not controlling the PAD. Instead, the PAD is controlled by chip 122, so chip 122 is the master and chip 124 is the slave.

FIG. 7 illustrates that, by design, chip 122 can only be the slave if it does not detect a signal event at all. FIG. 7 illustrates signal timing when both of the chips 122 and 124 detect a signal event, but one chip detects the signal event immediately, while the other chip's detection is slightly delayed. In the example shown in FIG. 7, chip 122 detects the signal event first. In this case, $EN_A$ drives the PAD high and sustains it in the high state until time $t_{AW}$, regardless of the state of $EN_B$. Because the PAD is controlled by chip 122, chip 122 is the master and chip 124 is the slave. In the reverse situation, if chip 124 detects the signal event first, $EN_B$'s control of the PAD will still expire prior to that of $EN_A$, and chip 122 will still be the master, maintaining PAD at logic '1' until time $t_{AW}$. Both of these cases therefore are similar to the case shown in FIG. 6.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A master-slave circuit comprising:
    a first integrated circuit chip having a first communication control circuit coupled to a first input/output port, the first communication control circuit being configured to output a first communication control signal having a first duration upon detection of a signal event by the first integrated circuit chip;
    a second integrated circuit chip having a second communication control circuit coupled to a second input/output port, the second communication control circuit being configured to output a second communication control signal having a second duration upon detection of the signal event by the second integrated circuit chip, the second duration being less than the first duration; and
    a bidirectional signal path coupling the first and second integrated circuit chips to one another via the first and second input/output ports, the first and second communication control circuits being configured to drive a common logic state of the first and second input/output ports based on the first and second communication control signals, wherein one of the first and second integrated circuit chips is dynamically configured as a master chip, and the other of the first and second integrated circuit chips is dynamically configured as a slave chip, based on the first and second communication control signals.

2. The master-slave circuit of claim 1 wherein the common logic state of the first and second input/output ports indicates whether or not the signal event has been detected by either one of the first and second integrated circuit chips.

3. The master-slave circuit of claim 2 wherein the signal event includes signal noise.

4. The master-slave circuit of claim 1 wherein a first one of the first and second integrated circuit chips that detects the signal event assumes control of the bidirectional signal path as the master chip.

5. The master-slave circuit of claim 1 wherein the first integrated circuit chip is configured to assume control of the bidirectional signal path when the signal event is detected by both the first and second integrated circuit chips simultaneously.

6. The master-slave circuit of claim 1 wherein the second integrated circuit chip is configured to assume control of the bidirectional signal path only when the first integrated circuit chip fails to detect a signal event.

7. The master-slave circuit of claim 1 wherein the integrated circuit chips are controller chips configured to control different portions of a touch screen.

8. The master-slave circuit of claim 1 wherein the first communication control circuit includes an active low tri-state buffer and an active high tri-state buffer.

9. The master-slave circuit of claim 1 wherein the second communication control circuit includes an active low tri-state buffer.

10. An electronic device including the master-slave circuit of claim 1, wherein the electronic device includes one or more of a printed circuit board, a communication device, or a computing device.

11. A method of operating a master-slave circuit, the method comprising:
   detecting a signal event by at least one of a first integrated circuit chip and a second integrated circuit chip;
   outputting, by the first integrated circuit chip, a first drive signal having a first duration upon detecting the signal event by the first integrated circuit chip;
   outputting, by the second integrated circuit chip, a second drive signal having a second duration that is less than the first duration upon detecting the signal event by the second integrated circuit chip;
   triggering a logic state change at an input/output port via at least one of the first drive signal and the second drive signal;
   dynamically assigning one of the first and second integrated circuit chips as a master chip, and the other of the first and second integrated circuit chips as a slave chip, based on the first and second drive signals; and
   thereafter, controlling, by the dynamically assigned master chip, a single bidirectional communication path shared by the first integrated circuit chip and the second integrated circuit chip.

12. The method of claim 11, further comprising communicating the detecting to the second integrated circuit chip via the bidirectional communication path.

13. The method of claim 11, further comprising:
   detecting the signal event simultaneously by the first and second integrated circuit chips; and
   triggering a logic state change at the input/output port via the second drive signal.

14. The method of claim 13 wherein the input/output port is held at a low logic state until one of the first and second integrated circuit chips triggers a logic state change.

15. The method of claim 13 wherein the first drive signal remains active for an active time interval in the range of 5-20 times longer than the duration of the second drive signal.

16. The method of claim 15, further comprising performing a check of a logic state of the input/output port after detection of the signal event.

17. The method of claim 16, wherein the check of the logic state of the input/output port is performed during the active time interval of the first drive signal, after the second drive signal has expired.

18. The method of claim 11 wherein the detecting, triggering, and controlling are carried out by a microprocessor.

19. The method of claim 18 wherein the microprocessor resides in the first integrated circuit chip.

20. A circuit comprising:
   a first integrated circuit chip having a first communication control circuit coupled to a first input/output port, the first communication control circuit being configured to output a first communication control signal having a first duration upon detection of a signal event by the first integrated circuit chip;
   a second integrated circuit chip having a second communication control circuit coupled to a second input/output port, the second communication control circuit being configured to output a second communication control signal having a second duration upon detection of the signal event by the second integrated circuit chip, the second duration being less than the first duration; and
   a bidirectional signal path coupling the first and second integrated circuit chips to one another via the first and second input/output ports, the first and second communication control circuits being configured to drive a common logic state of the first and second input/output ports based on the first and second communication control signals, wherein one of the first and second integrated circuit chips is dynamically configured as a master chip, and the other of the first and second integrated circuit chips is dynamically configured as a slave chip, based on which of the first and second communication control signals is output first,
   wherein the common logic state is held at a low logic state until the common logic state is driven to a high logic state based on the first and second communication control signals.

* * * * *